(12) United States Patent
Kogure

(10) Patent No.: US 10,077,705 B2
(45) Date of Patent: Sep. 18, 2018

(54) FLANGE STRUCTURE

(71) Applicant: CALSONIC KANSEI CORPORATION, Saitama (JP)

(72) Inventor: Shouta Kogure, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 0 days.

(21) Appl. No.: 15/037,649

(22) PCT Filed: Nov. 18, 2014

(86) PCT No.: PCT/JP2014/080411
§ 371 (c)(1),
(2) Date: May 18, 2016

(87) PCT Pub. No.: WO2015/076228
PCT Pub. Date: May 28, 2015

(65) Prior Publication Data
US 2016/0298521 A1    Oct. 13, 2016

(30) Foreign Application Priority Data

Nov. 19, 2013 (JP) .................................. 2013-238572

(51) Int. Cl.
*F16L 23/00* (2006.01)
*F01N 13/18* (2010.01)
(Continued)

(52) U.S. Cl.
CPC ......... *F01N 13/1855* (2013.01); *F01N 13/08* (2013.01); *F01N 13/1805* (2013.01);
(Continued)

(58) Field of Classification Search
CPC .............................. F16L 23/032; F16L 41/004
(Continued)

(56) References Cited

U.S. PATENT DOCUMENTS 217,997 A * 7/1879 Cushing .......................... 285/18
807,662 A * 12/1905 Crowther ................ F16L 33/32
285/179

(Continued)

FOREIGN PATENT DOCUMENTS

CN     202281575 U     6/2012
CN     203022854 U     6/2013
(Continued)

OTHER PUBLICATIONS

International Search Report and Written Opinion of the International Search Report for PCT/JP2014/080411 dated Mar. 3, 2015.

*Primary Examiner* — Aaron M Dunwoody
(74) *Attorney, Agent, or Firm* — Kenealy Vaidya LLP

(57) ABSTRACT

A flange structure for connecting together two members each having a flow path with different angles which can control an increase in flow resistance and can realize easy and stable manufacture can include a first member and a second member connected to each other through a flange. A central axis of a flow path of the second member can be slanted at a first angle with respect to a central axis of a flow path of the first member. The flow path of the first member and the flow path of the second member are allowed to communicate with each other by an in-flange flow path formed in the flange, and a second angle constituted of an acute angle between a central axis of the in-flange flow path and the central axis of the flow path of the first member is smaller than the first angle.

9 Claims, 2 Drawing Sheets

(51) Int. Cl.
*F16L 41/08* (2006.01)
*F01N 13/08* (2010.01)
*F16L 41/00* (2006.01)

(52) U.S. Cl.
CPC ..... *F01N 13/1827* (2013.01); *F01N 13/1844* (2013.01); *F16L 41/004* (2013.01); *F16L 41/086* (2013.01); *F01N 2340/00* (2013.01)

(58) Field of Classification Search
USPC ........ 285/139.1, 148.27, 208, 265, 412, 405
See application file for complete search history.

(56) References Cited

U.S. PATENT DOCUMENTS

| | | | | |
|---|---|---|---|---|
| 1,179,995 | A * | 4/1916 | Beckwith | F23J 13/025 126/292 |
| 1,352,102 | A * | 9/1920 | Tatro | F16L 27/0841 285/18 |
| 1,402,645 | A * | 1/1922 | Peress | B63C 11/10 285/10 |
| 1,526,336 | A * | 2/1925 | Hart | E03C 1/122 285/31 |
| 1,546,939 | A * | 7/1925 | Spencer | F16L 23/006 285/412 |
| 1,880,098 | A * | 9/1932 | Mair | H02G 3/06 285/184 |
| 2,178,240 | A * | 10/1939 | Pasquale | F16T 1/34 210/300 |
| 2,392,220 | A * | 1/1946 | Bruhn | F16L 43/002 285/182 |
| 2,693,223 | A * | 11/1954 | Krupp | B29D 23/001 156/144 |
| 4,813,713 | A * | 3/1989 | Peaster | F16L 27/02 285/13 |
| 5,480,195 | A * | 1/1996 | Diederichs | F16L 27/0849 285/184 |
| 6,109,665 | A * | 8/2000 | Meinig | F16L 23/12 285/365 |
| 6,957,832 | B1 * | 10/2005 | Pannekoek | E04H 12/187 248/122.1 |
| 7,490,631 | B2 * | 2/2009 | Kondo | F16L 23/00 138/109 |
| 7,909,636 | B2 * | 3/2011 | Brodeur | H02G 3/06 285/181 |
| 2010/0170234 | A1 * | 7/2010 | Way | F01N 3/2066 60/303 |
| 2012/0056418 | A1 * | 3/2012 | Boudry | F16L 27/0849 285/133.11 |
| 2015/0285418 | A1 * | 10/2015 | Rempert | F16L 41/18 285/363 |

FOREIGN PATENT DOCUMENTS

| | | |
|---|---|---|
| DE | 28 24 405 A1 | 12/1979 |
| JP | 60-47867 U | 4/1985 |
| JP | 1-148189 U | 10/1989 |
| JP | 2-29217 Y2 | 8/1990 |
| JP | 2005-30247 A | 2/2005 |
| JP | 2005-299827 A | 10/2005 |

* cited by examiner

FLANGE STRUCTURE

TECHNICAL FIELD

The invention relates to a flange structure for connecting together two members each having a flow path with different angles.

BACKGROUND ART

As a conventional flange structure, there is known a structure disclosed in the patent document 1. According to this conventional flange structure, in an exhaust manifold having multiple exhaust pipe connecting holes and a mounting hole for mounting it onto the cylinder head of an engine respectively formed in a board body, the board body is formed to have a swelling part projecting toward the exhaust flow-out side and including a vertical flange in the outer periphery thereof and an inclined end face, and the exhaust pipe connecting holes are formed in the inclined end face, whereby an exhaust pipe can be mounted on the vertical flange of this flange with an inclined angle.

RELATED DOCUMENTS

Patent Documents

Patent Document 1: JP-UM-Y-H02-29217

SUMMARY OF THE INVENTION

Problems that the Invention is to Solve

However, in the above-mentioned conventional flange structure, when the engine-side exhaust pipe end part and flange are connected together with different angles, there is raised the following problem.

That is, in the conventional flange, the bent front end part of the exhaust pipe is inserted and fixed by welding to the vertical flange of the inclined end face formed inclined relative to the mounting surface of the flange (flange sealing surface).

Thus, when welding together the front end part of the exhaust pipe and the vertical flange of the flange, the fitting portion thereof can be shaky and unstable, thereby making it difficult to attain good welding.

When the front end side of the exhaust pipe is formed straight in order to avoid such problem, the middle part of the exhaust pipe must be bent with smaller curvature. In this case, ventilation resistance within the exhaust pipe increases, resulting in the poor flow of the exhaust gas.

The invention aims at solving the above problem and thus has an object to provide a flange structure for connecting together two members each having a flow path with different angles, which can control an increase in flow resistance when fluid flows therein and can realize easy and stable manufacture thereof.

Means for Solving the Problems

In attaining this object, according to an embodiment of the invention, there is provided a flange structure including: a first member; and a second member connected to the first member through a flange with a central axis of a flow path of the second member slanted at a first angle with respect to a central axis of a flow path of the first member, wherein: the flow paths of the first and second members are allowed to communicate with each other by an in-flange flow path formed in the flange; and a second angle constituted of an acute angle between a central axis of the in-flange flow path and the central axis of the flow path of the first member is smaller than the first angle.

Advantages of the Invention

The flange structure of the invention provides a flange structure for enabling communication between the flow paths of the first and second member with the central axis of the flow path of the second member slanted at the first angle with respect to the central axis of the flow path of the first member, wherein the second angle between the central axis of the in-flange flow path and the central axis of the flow path of the first member is smaller than the first angle. Thus, change in the angle of flow of fluid can be reduced, thereby enabling reduction in flow resistance within the flange flow path.

MODES FOR CARRYING OUT THE INVENTION

Figure 1:
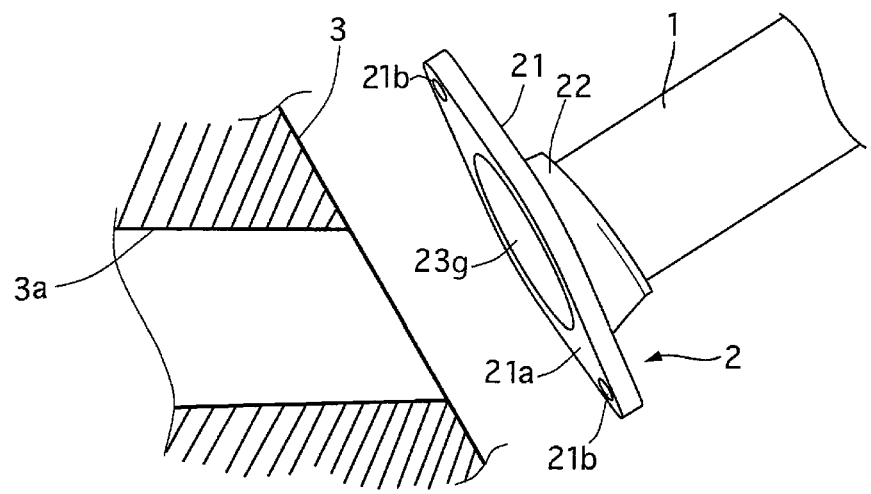
FIG. 1 is a perspective view of a flange structure according to an embodiment 1 of the invention.

Description is given below specifically of the mode for carrying out the invention with reference to an embodiment shown in the drawings.

Embodiment

Firstly, description is given of the whole of the flange structure of the embodiment 1 with reference to FIG. 1. The flange structure of the embodiment 1 is used in part of an exhaust system for discharging outside a car, for example, an exhaust gas emitted from the engine of the car.

An exhaust pipe 1, which is an example of a first member, has a cylindrical shape extending linearly and, as shown in FIG. 1, one end part thereof is inserted into an insertion hole 24 (shown in FIGS. 2 to 4 to be discussed later) formed in the projecting part 22 of a flange 2, and is fixed thereto by welding.

This flange 2 is connected and fixed to a second member 3 by a bolt (not shown) or the like. Thus, an exhaust path of the exhaust pipe 1 is connected through the flange 2 to an exhaust path 3a of the second member 3 formed to have a different angle therefrom. Here, an exhaust path 3ep formed within the exhaust pipe 1 and the exhaust path 3a of the second member 3 respectively correspond to the flow path of the invention.

Here, the exhaust pipe 1 is mounted onto the second member 3 while it is inclined from an upper right direction and from this side direction in the sheet of FIG. 1. Therefore, FIG. 1 shows that a sealing surface 21a of a mounting part 21 of the flange 2 on the second member 3 is slanted with respect to the central axis of the exhaust pipe 1 (first member). Thus, in a state where the central axis of the exhaust path 3a (flow path) of the second member 3 is inclined at an angle θ1 (first angle) to the central axis of the exhaust path (flow path) of the exhaust pipe 1 (first member), the exhaust pipe 1 and second member 3 are connected to each other through the flange 2 (see FIG. 4 to be discussed later). This connection allows the exhaust path of the exhaust pipe 1 and the exhaust path 3a of the second member to communicate with each other through the flow path within the flange 2.

Figure 2:
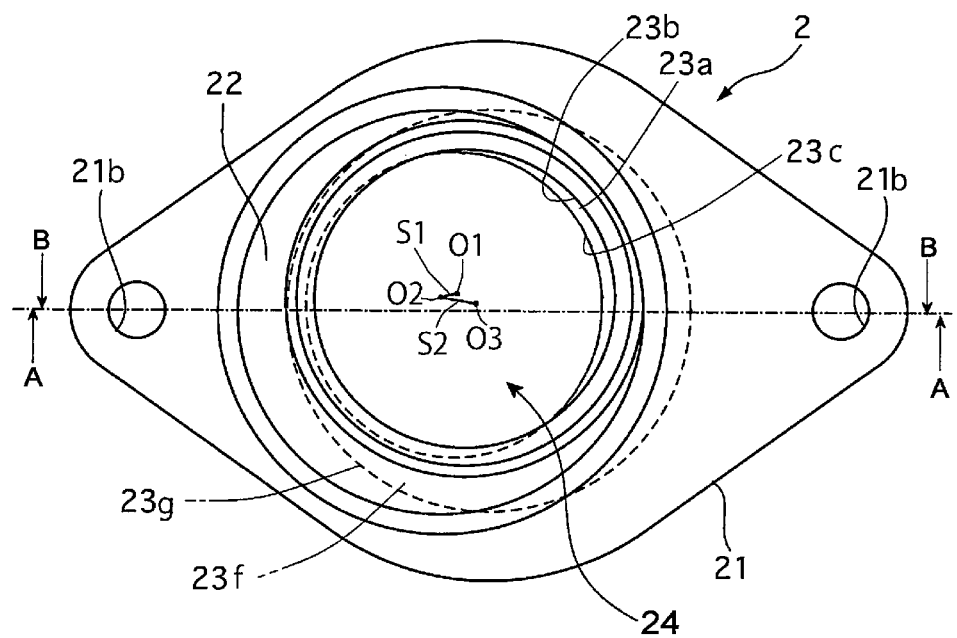
FIG. 2 is a plan view of a flange used in the flange structure of the embodiment 1.
Figure 3:
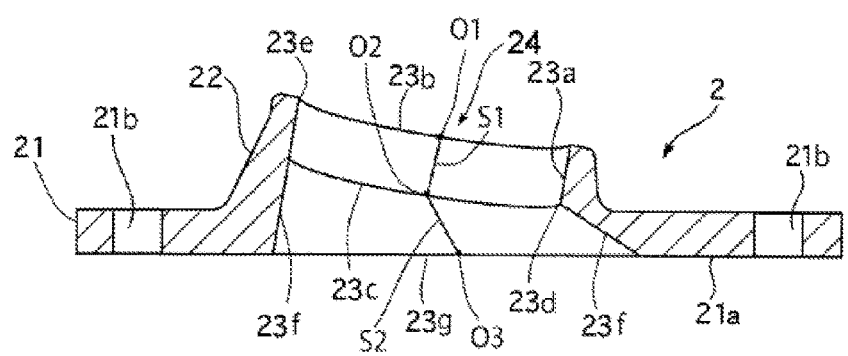
FIG. 3 is a section view of the left side surface of the flange of the embodiment 1.
Figure 4:
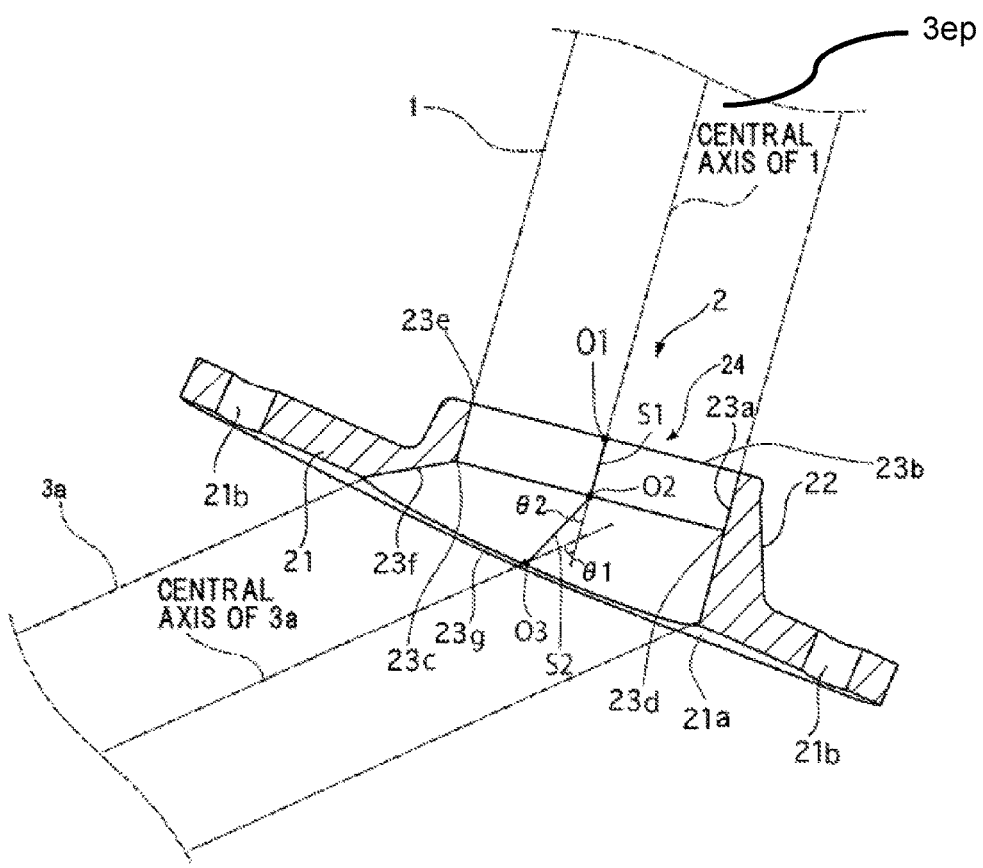
FIG. 4 is a section view of the right side surface of the flange of the embodiment 1.

Next, description is given more specifically of the structure of the flange 2 with reference to FIGS. 2 to 4.

FIG. 2 is a plan view when it is viewed from the side where the exhaust pipe 1 is mounted thereon, FIG. 3 is a section view when it is viewed from the deep side (in FIG. 2, the arrow A side) of the sheet of FIG. 1, and FIG. 4 is a section view when it is viewed from this side (in FIG. 2, the arrow B side) of the sheet of FIG. 1.

Here, since the flange 2 is inclined in the above-mentioned manner, the section views of FIGS. 3 and 4 are not identical with each other. That is, in FIG. 3, a sealing surface 21a of the mounting part 21 is viewed to be a straight line, and an opening 23b formed on the exhaust pipe 1 mounting side of the projecting part 22 is viewed to be rounded, whereas in FIG. 4, reversely to FIG. 3, the opening 23b is viewed to be a straight line and the sealing surface 21a of the mounting part 21 is rounded and the whole thereof can be seen.

The flange 2 is structured such that the mounting part 21 constituted of a diamond-shaped flat plate and the projecting part 22 projecting slantingly from the mounting part are integrated.

The mounting part 21 is contacted with the second member 3 through a seal (not shown), while the surface thereof in the opposite direction to the projecting part 22 serves as the sealing surface 21a. And, the mounting part 21 has two bolt holes 21b respectively formed in such two ends of the diamond-shaped flat plate as exist across the projecting part 22, whereby the flange can be fixed to the second member 3 by inserting bolts (not shown) into the bolt holes 21b.

The projecting part 22 projects integrally with the mounting part 21 as described above and slantingly therefrom. That is, it is slanted with respect to the mounting part 21 in a two-dimensional direction from the right side of the sheet of FIG. 2 toward the deep side. It includes therein a linear inner surface portion 23a having a cylindrical inner surface for connecting together an upper end side opening 23b and a lower end side opening 23c shown in FIGS. 3 and 4. Here, the upper end side opening 23b and lower end side opening 23c are slanted relative to the sealing surface 21a.

Here, in the lower end side opening 23c, as shown in FIGS. 3 and 4, the lower-most end position 23d thereof exists near to such surface of the mounting part 21 as exists on the projecting part 22 side. The lower end side opening 23c ascends from the lower-most end position 23d by such amount as the projecting part 22 slants with respect to the mounting part 21, while a position existing on the opposite side to the lower-most end position 23d provides the uppermost position 23e thereof.

Here, an exhaust path formed by the linear inner surface portion 23a provides an insertion hole 24 into which one end part of the exhaust pipe 1 is inserted. The shape and inside diameter of the inner surface of the exhaust path formed by the linear inner surface portion 23a are set to the outer shape and outside diameter of the above-mentioned one end part of the exhaust pipe 1 such that this one end part can be inserted into the exhaust path formed by the linear inner surface portion 23a and can be prevented from shaking more than necessary.

Continuously with the lower end side opening 23c of the linear inner surface portion 23a of the flange 2, there is formed a tapered inner surface portion 23f the flow section area of which expands toward the sealing surface 21a.

The tapered inner surface portion 23f is slanted with respect to the central axis S1 of the linear inner surface portion 23a and sealing surface 21a. The tapered inner surface portion 23f is formed as follows. That is, the upper end side thereof has the same shape and inside diameter as the linear inner surface portion 23a; the inner surface thereof is slanted such that the flow section area thereof expands downward; and, in an opening 23g formed in the sealing surface 21a, it has substantially the same shape and inside diameter as the exhaust path 3a of the second member 3.

Centers 01, 02 and 03 shown in FIGS. 2 to 4 are the centers of the following portions. The center 01 is the center of the upper end side opening 23b of the linear inner surface portion 23a. The center 02 is the center of the lower end side opening 23c of the linear inner surface portion 23a and is also the center of the upper end side opening of the tapered inner surface portion 23f. The center 03 is the center of the lower end side opening of the tapered inner surface portion 23f formed on the sealing surface 21a.

FIG. 2 is a view of the flange when viewed from such side of the mounting part 21 as mounts the exhaust pipe 1 thereon (from above in the vertical direction) and, in FIG. 2, the centers 01 and 02 are offset to the left side in FIG. 2 (left side in FIG. 3, right side in FIG. 4) and are slightly offset to the upper side in FIG. 2 with respect to the center 03.

Here, in FIGS. 2 to 4, there are shown the central axis S1 of the linear inner surface portion 23a connecting the centers 01 and 02 to each other, and the central axis S2 of the tapered inner surface portion 23f connecting the centers 02 and 03.

Thus, in the linear inner surface portion 23a and tapered inner surface portion 23f, their centers 01, 02 and 03 are offset (decentered) and their central axes S1, S2 are slanted (have a deviation angle). When one end part of the exhaust pipe 1 is inserted into the linear inner surface portion 23a, the central axis of the exhaust path of the exhaust pipe 1 becomes coincident with or parallel to the central axis S1. Therefore, as shown in FIG. 4, a first angle θ1 formed by the central axis of the exhaust path 3a of the second member 3 with respect to the central axis of the exhaust path of the exhaust pipe 1 provides an angle between the central axis S1 and the central axis of the exhaust path 3a of the exhaust pipe 1. And, a second angle θ2 constituted of an acute angle between the central axis S2 of the flow path within the flange 2 and the above central axis S1 is smaller than the first angle θ1.

The above flange structure of the embodiment 1 can provide the following effects.

In the flange structure of the embodiment 1, the second angle θ2 constituted of an acute angle between the central axis S2 of the flow path within the flange 2 and the central axis of the exhaust path of the exhaust pipe 1 is smaller than the first angle θ1 formed by the central axis of the exhaust path 3a of the second member 3 with respect to the central axis of the exhaust path of the exhaust pipe 1. This can reduce change in the flow angle of the exhaust gas, thereby enabling reduction in flow resistance of the exhaust gas within the flange 2.

Further, the centers 01, 02, 03 of the linear inner surface portion 23a and tapered inner surface portion 23f are offset (decentered) and their central axes S1, S2 are slanted (have a deviation angle). In such flange structure, when the first exhaust pipe 1 and second member 3 are assembled together by the flange 2 with a specific angle of not 0°, the linear inner surface portion 23a and tapered inner surface portion 23f of the flange 2 absorb this angle. This can control an increase in flow resistance when the exhaust gas flows and also can prevent the flow of the exhaust gas from worsening inexpensively and simply.

Also, the linear inner surface portion 23a, which provides the inner surface (first inner surface) of the insertion hole 24 of the flange 2 into which the exhaust pipe 2 is inserted, is shaped to the shape or outside diameter of one end part of the exhaust pipe 1. Thus, when welding the exhaust pipe 1 to the flange 2, the exhaust pipe 1 can be supported by the inner surface (first inner surface) of the insertion hole 24 of the flange 2, thereby enabling easy welding without shaking.

Also, since the flange 2 includes the tapered inner surface portion 23f, ventilation resistance can be reduced, thereby enabling improvement in the flow of the exhaust gas.

Further, even when the exhaust path of the exhaust pipe 1 and the exhaust path 3a of the second member 3 are different in shape and size, the entrance side (opening 23b) of the flange 2 can be matched to the exhaust path of the exhaust pipe 1 and, by changing the slanting angle and length of the tapered inner surface portion 23f, the exit side (opening 23g) thereof can be matched to the shape and size of the exhaust path 23a of the second member 3, thereby enabling smooth connection between the exhaust pipe 1 and second member 3.

Also, when welding the exhaust pipe 1 and second member 3, a welding torch can be inserted from the tapered inner surface portion 23f side having a large opening diameter for welding, thereby enabling facilitation of welding.

Also, since the linear inner surface portion 23a of the flange 2 has an angle relative to the mounting part 21, two members having different angles, namely, the exhaust pipe 1 and second member 3 can be connected to the flange 2 even without bending.

Although the invention has been described heretofore with reference to the above embodiment, the invention is not limited the embodiment but, even when the design and the like of the invention are changed without departing from the subject matter of the invention, such design change falls within the scope of the invention.

For example, the linear inner surface portion 23a and tapered inner surface portion 23f are not limited to the embodiment but the shapes and sizes thereof and the path lengths thereof can be set properly.

Also, as the second member, a similar flange may also be used and thus the flanges may also be connected together while they are opposed to each other.

Also, the flange structure of the invention can also be applied to other systems than the exhaust-based system of a car and can be used to other fluid than the exhaust gas. That is, liquid may also be made to flow in the flange structure.

Also, in the flange structure of the invention, the fluid flow direction may be any one of a direction going from the second member toward the first member and a direction going from the first member toward the second member.

Also, the following flange structure also falls under the invention.

A flange structure in which, in a state where first and second members each having a flow path have different angles, the end part of the first member is connected to the second member through an inserted and fixed flange, whereby the flow paths of the first and second members are allowed to communicate with each other, characterized in that the flange includes an absorbing device capable of absorbing the different angles of the first and second members (for example, the above-mentioned linear inner surface portion 23a and tapered inner surface portion 23f correspond to the absorbing device).

The absorbing device is structured as follows. The insertion hole of the flange for insertion of the first member is slanted obliquely relative to a sealing surface for mounting the flange thereon; the central axis of the insertion hole of the flange for insertion of the first member is offset with respect to the central position of an opening formed in the sealing surface for mounting the flange; and, the insertion side of the flange insertion hole for insertion of the first member has a linear inner surface portion providing a straight line, and the sealing surface side of the flange has a tapered inner surface portion slanted relative to the central axis of linear inner surface portion and sealing surface.

According to the above structure, when the first and second members are connected together with different angles, the insertion hole of the flange for insertion of the first member can absorb the different angles. In this case, by obliquely slanting the insertion hole of the flange for insertion of the first member with respect to the sealing surface for mounting the flange thereon, the first and second members, without bending them, can be connected together by the flange. By offsetting the central axis of the insertion hole of the flange for insertion of the first member with respect to the central position of an opening formed in the sealing surface for mounting the flange thereon, the welding quality of the first member and flange can be enhanced. Also, by forming the insertion hole of the flange for insertion of the first member to have a linear inner surface portion providing a straight line, when welding the first member to the flange, the first member can be supported by the linear inner surface portion of the insertion hole of the flange, thereby enabling easy welding without shaking. Also, provision of the tapered inner surface portion can improve flow of the fluid and thus can reduce flow resistance. And, even when the entrance side and exit side of the flange are different in diameter, shape and inclination depending on the relationship between the flow paths of the first and second members, they can be connected. Also, since a welding torch can be easily inserted into the tapered inner surface portion side, welding between the first member and flange can be facilitated.

Here, the present application is based on the Japanese Patent Application (Japanese Patent Application No. 2013-238572) filed on Nov. 19, 2013 and thus the whole thereof is used herein by citation. All references cited herein are incorporated herein as a whole.

DESCRIPTION OF REFERENCE NUMERALS AND SIGNS

01: Center of opening on upper end side of linear inner surface portion
02: Center of opening on lower end side (and upper end side of tapered inner surface portion) of linear inner surface portion
03: Center axis of opening on lower end side of tapered inner surface portion
S1: Central axis of linear inner surface portion
S2: Central axis of tapered inner surface portion
θ1: First angle
θ2: Second angle
1: Exhaust pipe
2: Flange
21: Mounting part 21a: Sealing surface
21b: Bolt hole
22: Projecting part
23a: linear inner surface portion
23b: Opening on upper end side
23c: Opening on lower end side
23d: Lower-most end position
23e: Upper-most end position
23f: tapered inner surface portion
23g: Opening on sealing surface
3: Second member
3a: Exhaust path

The invention claimed is:

1. A flange for connecting a first member to a second member, comprising:
a mounting part having an opening formed therein including a sealing surface opening in a sealing surface of the mounting part;
a projecting part integral with and extending from the mounting part and including the opening extending therethrough to an upper end side opening such that the opening in the mounting part extends entirely through the flange from the sealing surface opening to the upper end side opening, wherein
the opening is defined by a linear inner surface portion that extends from the upper end side opening of the opening to a tapered inner surface portion that extends at an acute angle with respect to the linear inner surface portion to the sealing surface opening at a first diametrical location of the opening, and is defined by the linear inner surface portion that extends from the upper end side opening of the opening to the tapered inner surface portion that extends collinear with respect to the linear inner surface portion to the sealing surface opening at a second diametrical location of the opening diametrically opposed to the first diametrical location, such that the opening has a non-linear central axis that extends through the flange and changes direction at a location between the sealing surface opening and the upper end side opening.

2. The flange according to claim 1, wherein:
the flange changes a flow direction of fluid flowing from one of the first member and the second member toward the other one of the first member and the second member.

3. The flange according to claim 1, further comprising:
a connecting part configured to be coaxially connected with the first member;
a connecting opening configured to be connected with the second member; and
a tapered part configured to connect the connecting part with the connecting opening, wherein
a flow section area of the tapered part expands from the connecting opening toward the connecting part.

4. The flange according to claim 3, wherein:
the second member is formed with an opening inclining in relation to a central axis of the second member.

5. The flange according to claim 3, wherein
the central axis of the flange is a virtual line between a center of an end part of the connecting part and a center of the connecting opening.

6. The flange according to claim 1
wherein the flange is fixed to the first member by welding.

7. The flange according to claim 1, wherein:
each of the first member and the second member includes a straight pipe connecting a base part and a connection part with the flange.

8. The flange according to claim 1, wherein:
the flange is configured to connect together the first member and the second member each having a flow path with different angle, and to control an increase in flow resistance when fluid flows in the flange in order to realize easy and stable manufacture of the flange structure.

9. The flange according to claim 1, wherein a center of the opening as viewed from a vertical orientation above the flange along the central axis at the sealing surface opening, at the upper end side opening, and at a location between the sealing surface opening and the upper end side opening are spaced from each other.

* * * * *